United States Patent [19]

Eichenlaub

[11] Patent Number: 5,606,455
[45] Date of Patent: Feb. 25, 1997

[54] AUTOSTEREOSCOPIC DISPLAY WITH HIGH POWER EFFICIENCY

[75] Inventor: Jesse B. Eichenlaub, Penfield, N.Y.

[73] Assignee: Dimension Technologies, Inc., Rochester, N.Y.

[21] Appl. No.: 478,028

[22] Filed: Jun. 7, 1995

Related U.S. Application Data

[62] Division of Ser. No. 58,318, May 6, 1993, Pat. No. 5,457, 574.

[51] Int. Cl.$^6$ .......................... G02B 27/22; G02B 27/10
[52] U.S. Cl. ......................... 359/463; 359/462; 359/619
[58] Field of Search ..................... 359/462, 463; 348/51, 54, 59

[56] References Cited

U.S. PATENT DOCUMENTS

| | | | |
|---|---|---|---|
| 2,891,444 | 10/1955 | Ewald | 359/463 |
| 4,717,949 | 1/1988 | Eichenlaub | 348/54 |
| 5,036,385 | 7/1991 | Eichenlaub | 348/59 |

Primary Examiner—Paul M. Dzierzynski
Assistant Examiner—Audrey Chang
Attorney, Agent, or Firm—Cumpston & Shaw

[57] ABSTRACT

An autostereoscopic display is disclosed having an optical system and one or more light sources which provide high brightness of the observed three-dimensional images and high brightness-to-input-power ratio by having the light beam passing through the optical system (including a flat monochrome or color display panel) directed to the observer's eyes, instead of being diffused across the field of view.

15 Claims, 11 Drawing Sheets

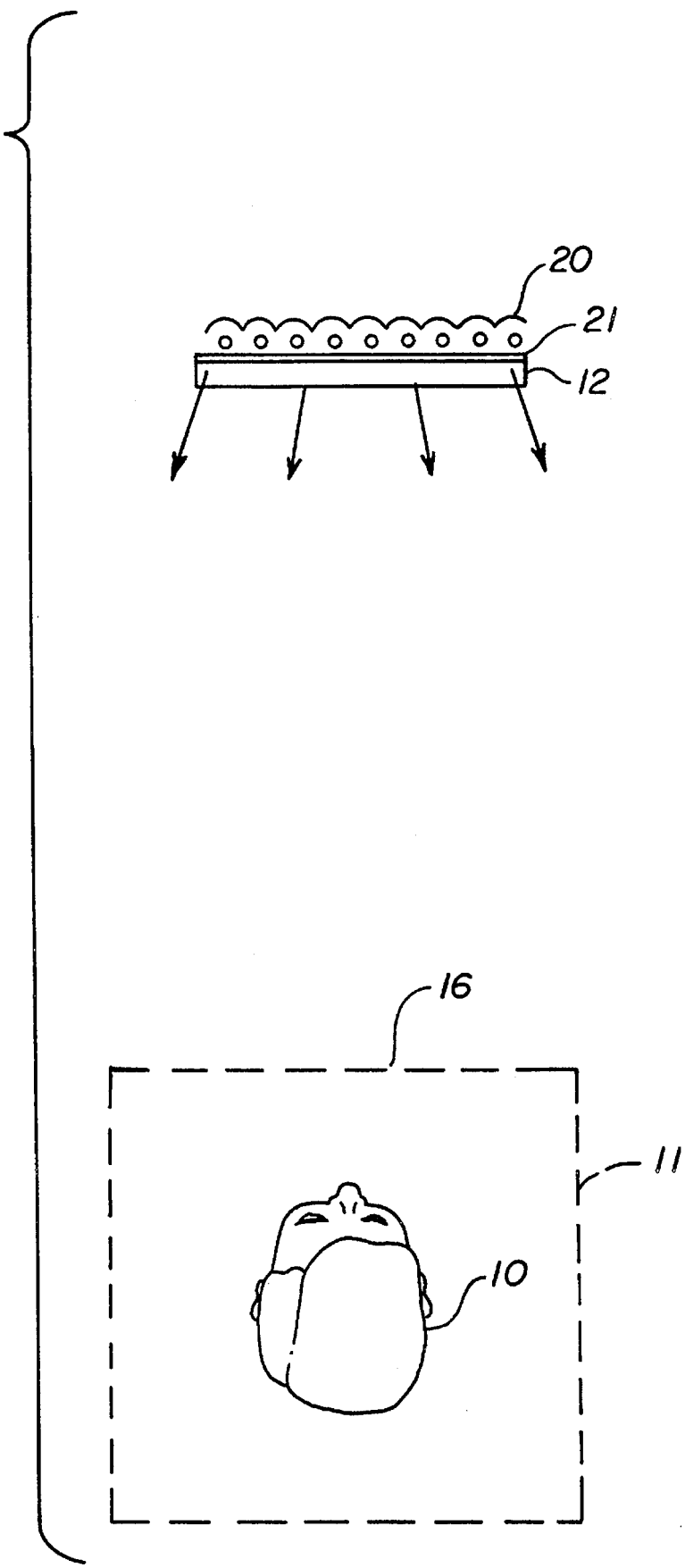

FRONT 5,606,455

AUTOSTEREOSCOPIC DISPLAY WITH HIGH POWER EFFICIENCY

This is a divisional application Ser. No. 08/058,318 filed on May 6, 1993, now U.S. Pat. No. 5,457,574.

BACKGROUND

1. Field of the Invention

This invention relates to flat panel autostereoscopic displays and optical means for achieving high brightness of the images and high brightness-to-input-power ratio of the displays.

2. Prior Art

U.S. Pat. Nos. 4,717,949, 4,829,365, 5,036,385 and 5,040,878 disclose autostereoscopic display devices with an array of thin, vertical, parallel, equidistant, light emitting lines behind a flat, transmissive, electronically controlled display panel, such as a liquid crystal display (LCD), to generate for an observer a perception of three-dimensional images. These patents describe various means for generating an array of thin light lines as the means for creating stereoscopic images, but, they all share the disadvantage of a relatively low image brightness. Color LCDs have a very low light transmission, and thus, a relatively low ratio of brightness-to-input-power. High brightness, compact, power-efficient stereoscopic displays are important in many applications where images are to be observed in an environment with high levels of ambient light, such as in aircraft cockpits or outdoors.

It is therefore an object of this invention is to provide a high brightness autostereoscopic display by directing most of the illuminating light toward the eyes of the observer.

A further object of this invention object of this invention is to provide a high brightness autostereoscopic display having a high brightness-to-input-power ratio.

An additional object of this invention is to provide an autostereoscopic display which includes means of tracking the position of more than one observer's head, such that each of the observers can view autostereoscopic three-dimensional (3D) images without head position restrictions.

Another object of this invention is to provide a compact high brightness autostereoscopic display.

Still a further object of this invention is to provide a high brightness autostereoscopic display utilizing an incandescent light source or sources.

Yet another object of this invention is to provide a high brightness autostereoscopic display utilizing a stroboscopic plasma arc discharge source or sources.

Still an additional object of this invention is to provide a high brightness autostereoscopic display which includes a means for tracking the position of the head of the observer such that limitations regarding the position of the head (in which stereoscopic images can be perceived) are substantially removed.

Yet still another object of this invention is to provide a high brightness autostereoscopic display which generates full resolution images.

A further object of this invention is to provide a high brightness autostereoscopic display with a high brightness-to-input-power ratio, which permits the observer to "look around" the objects or a scene displayed in the image so as to see the contents from a natural perspective.

These and other objects of this invention will be apparent to those skilled in the art upon reference to the following specification and claims.

SUMMARY OF THE INVENTION

In accordance with this invention there is provided a high brightness transmissive autostereoscopic display with high brightness-to-input-power ratio, having an optical system which directs most of the light from an illumination source or sources toward the eyes of the observer, the display comprising a bright light source or sources; a first optical means for collimating and directing the light radiated by the light source or sources; a second optical means for generating an image of a plurality of thin, bright, equidistant, vertical light lines, the light lines being in a certain alignment and spacing with respect to the vertical boundaries between the columns of light valves of a flat light-transmitting display panel, the light valves arranged in a two-dimensional array and individually controllable; a weak light-diffusing means where images of said light lines are formed; and a third Optical means that directs said light from said light lines, after it has passed through said display panel, to the region of space near the eyes of the observer. It is understood that the function of the first and third optical means can be combined into a single optical means. It is also understood the weak light-diffusing means may be omitted in some versions of the display.

BRIEF DESCRIPTION OF THE DRAWINGS

FIG. 2 is a modification of the display of FIG. 1a to achieve power savings.

DESCRIPTION OF THE PREFERRED EMBODIMENTS

Figure 1A:
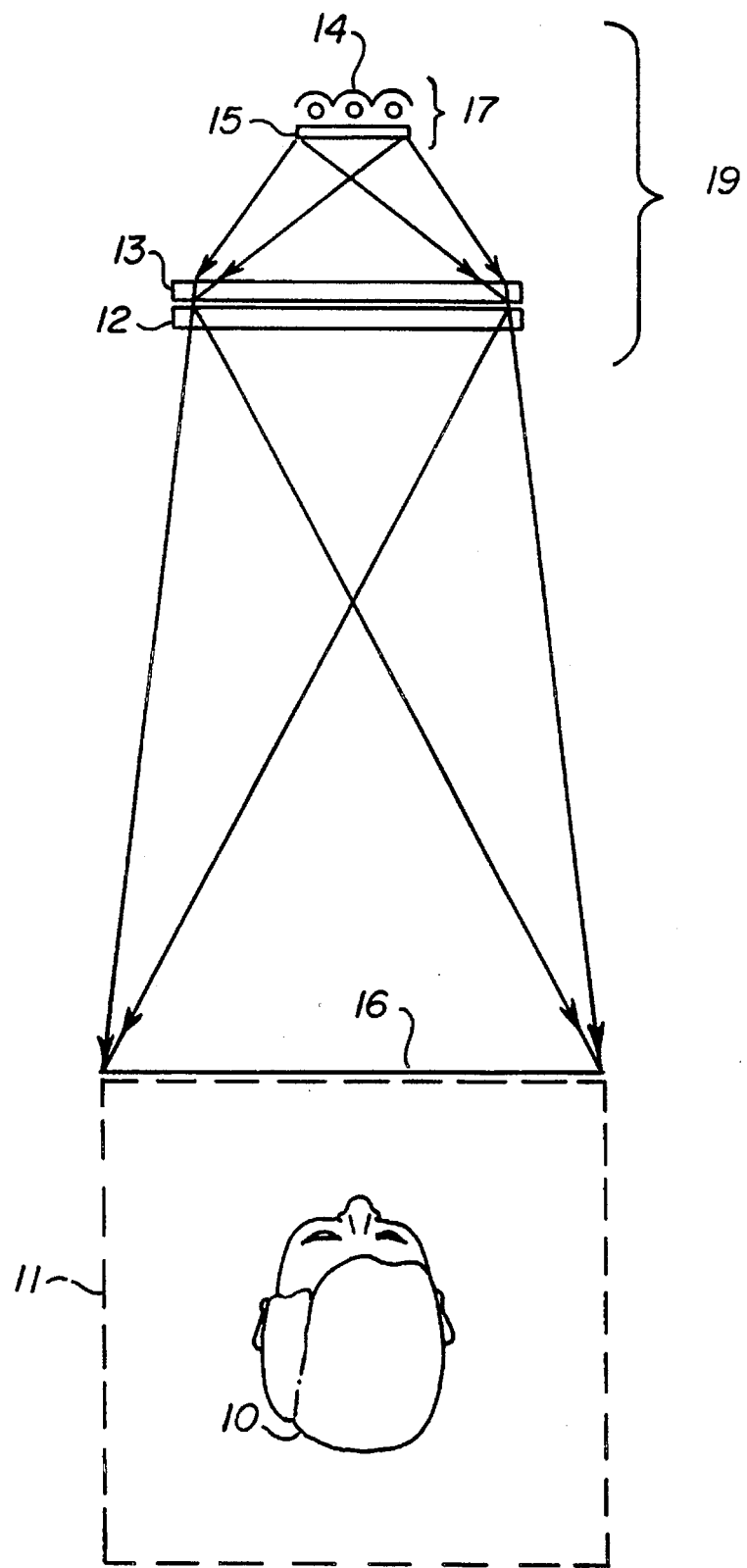
FIG. 1a schematically shows the basic concept of light concentration in an autostereoscopic display.

FIG. 1a illustrates the basic concept of light concentration method schematically in its simplest form. It can typically be employed in a situation where an observer 10, is constrained by work environment factors to keep his or her head within a certain observation volume (marked by the dotted line) 11. Such a situation occurs for example where the observer is a pilot who is strapped securely in the tight compartment of a fighter aircraft.

The autostereoscopic display 19 of this invention has a transmissive display 12, such as an LCD, which displays information the observer must be able to see from anywhere within the head volume 11. This being the case light can be efficiently concentrated toward the volume 11 by use of a Fresnel lens 13 or a similar convex focusing lens or holographic lens element situated behind the LCD 12 as shown.

A bank of lamps 14 illuminate a small diffuser 15, thus creating a light source 17 having a light emitting area equal to the area of the diffuser 15, and a certain emissive flux per unit area. The emissive area is just large enough so that its image 16 is projected onto or near the front of the head box area by the lens 13. In order to accomplish this, the ratio of the width and height of the area of the diffuser 15 to the width and height of the front of head volume 11 must both be equal to the ratio of the distance between the emissive area of the diffuser 15 to the center of the lens and the center of the lens 13 and the front of head volume 11, as is well known to those knowledgeable in optics. Under these conditions, the observer 10 will see light through the display from anywhere within the head volume. Furthermore, if the illumination on the diffuser 15 is even, and the lens 13 is of good quality, the illumination seen by the observer 10 from any given position, which is an image on part of the diffuser 15 will also be even.

The vertical dimensions of the head volume 11 are sometimes determined by the fact that different observers 10 are of different heights when sitting, and there are differences in the distance from their eyes to the base of their seat, and differences in the positioning of their seat relative to the floor and the back of their seat relative to the display. Once the observer 10 is seated and the seat adjusted, there is relatively little vertical movement possible for the observer's head, while seated. Movement is constrained by the observer's own body construction to side to side and back and forth movement for the most part. Therefore, for a given observer 10, the necessary head box 11 within which light must be concentrated can be much narrower in the vertical direction, and potentially in the horizontal as well, since the light only has to be visible and perceived to be even within the volume that the particular observer's eyes can occupy as the observer undergoes normal movement.

Figure 1B:
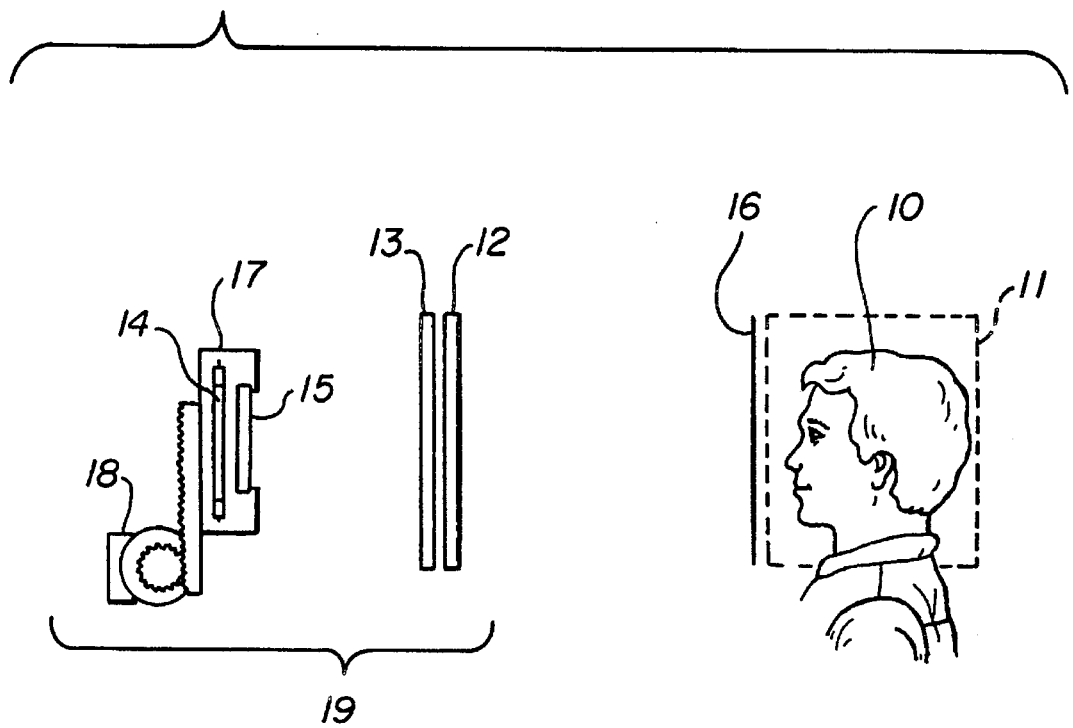
FIG. 1b is a side view of a the display of FIG. 1a modified to accommodate differences in an observer's height.

A feature that can be added to accommodate differences in observer 10 height and position preferences, and also allow increased power efficiency by allowing the concentration of light into the vertically narrower area appropriate for a given observer, and yet still let the user see the display from all possible positions while undergoing movement, is illustrated in FIG. 1b, a side view of the system.

In FIG. 1b mechanical gear means 18, such as a linear motor and appropriate mechanical devices such as gearing, is used to raise and lower the light source 7 in the vertical (Y) direction (of a typical solid geometry figure) under command by the observer 10 or by previous setting, causing the illuminated area to move vertically to be centered on the observer's typical eye position. Once the position is set for a given observer 10 it is unlikely to have to be set again for that same observer 10, provided the mounting of light source 17 is rigid and does not allow it to move under normal use. Means may also be provided to adjust the position of the illuminated area in the Z direction. This would allow optimal focusing distance of the image area 16 to accommodate user seating preference. Adjustment in the X direction can also be accommodated by similar means, but this will not usually be necessary or practical. In most situations, the user will sit directly in front of the display.

The advantage of this arrangement in terms of power savings can be illustrated by comparing it to the display of FIG. 2, which shows an LCD 12 illuminated by conventional means, namely a light source 20 illuminating a diffuser 21 which creates an emitting area covering the entire back surface of the LCD 12. The arrangement of FIGS. 1a and 1b will achieve the same results, in terms of perceived brightness, by using the same type of lamps to illuminate the much smaller diffuser area 15 at the same brightness per unit area.

According to principles of optics that are well known to those familiar with the art, when a lambertian diffuse source, such as diffuser area 15, is imaged by a set of optics, such as lens 13, the perceived brightness per unit angle seen by the observer 10 when viewing the image directly will be equal to the perceived brightness per unit angle when viewing the smaller diffuser area 15 directly, minus whatever fraction of the light is absorbed by the optics, which is usually rather low. This is true regardless of how much the area is magnified or reduced magnified.

Thus, in the case of FIG. 1a, nearly the same display brightness is achieved as in FIG. 2 by illuminating a much smaller area. Since power consumption is roughly proportional to the area illuminated, all other factors being equal, the display of FIG. 1a achieves the same apparent brightness with much lower power consumption. In a system of this type, an upper bound is placed on the brightness achievable with the system by the original brightness of diffuser area 15 and light scattering properties of diffuser area 15. In general, as stated above, the perceived brightness will be slightly less that the perceived brightness of the original diffuser area 15.

The amount of power that can be saved compared to the typical conventional system is dependent upon the ratio of the dimensions of the diffuser areas 15 in FIGS. 1a and 1b and of the diffuser 21 in FIG. 2.

A special case exists when the light source is a very small point like source, like a halogen lamp without a reflector. In that case, extremely high intensities can be achieved within a very small image area 16. It is likely that the image area 16 formed by simply reimaging such a source will be too small to be useful, and the brightness too high. In such a situation, the perceived brightness can be decreased and the viewing area increased by letting the light source 17 shine on a diffuser 15 covering a wider area such as that shown as diffuser 15 in FIG. 1a. Nevertheless, there are some situations in which an undiffused or minimally diffuse point like source can be employed, as will be seen.

Figure 3:
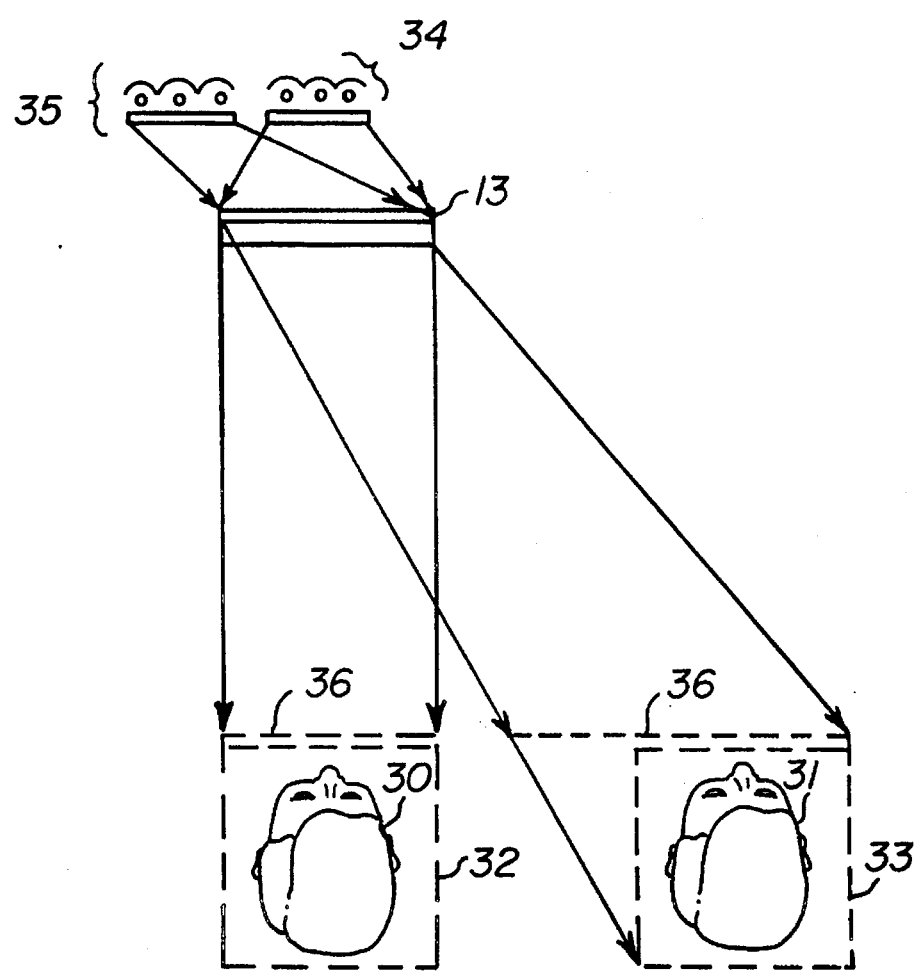
FIG. 3 is a modification of the display of FIG. 2 for simultaneous viewing by two observers.

The same general principles can be employed in a situation where two observers 30, 31 are present in FIG. 3. The observers heads 30, 31 are both constrained to volumes 32, 33 by the environment, which again is a situation that is common in vehicle situations, especially within aircraft. In FIG. 3 the two light sources 34 and 35, both of the correct size and position, give light that is imaged 36 by lens 13 near the front of the head volumes 32 and 33. Although two observers 30, 31 are shown, it is possible to accommodate more observers if more light sources are used.

The light concentration effect can be used to good effect to provide autostereoscopic three-dimensional (3D) images in addition to high power efficiency, as is explained in co-pending United States application Ser. No. 07/896,211 filed Jun. 10, 1992.

This system, though, suffers from a little known effect. When left and right eye stereo images are presented in a field sequential manner, in which a complete left eye image is shown, to the left eye, followed by a complete right eye image shown to the right eye the resulting perceived stereo effect is less vivid than that perceived when left and right eye images are presented simultaneously, even when the images are presented at rates where no appreciable flicker is seen. The reasons for this are unclear, but the effect has been noted by personnel who have used both types.

The embodiments of this invention allow the same sort of light concentration and multiple person head tracking to be achieved but without the field sequential image presentation above. It does so by use of a light line illumination systems similar to those employed in patents discussed above in which left and right eye images, or in some cases parts of left and right eye images, are always presented simultaneously to both eyes.

Figure 4:
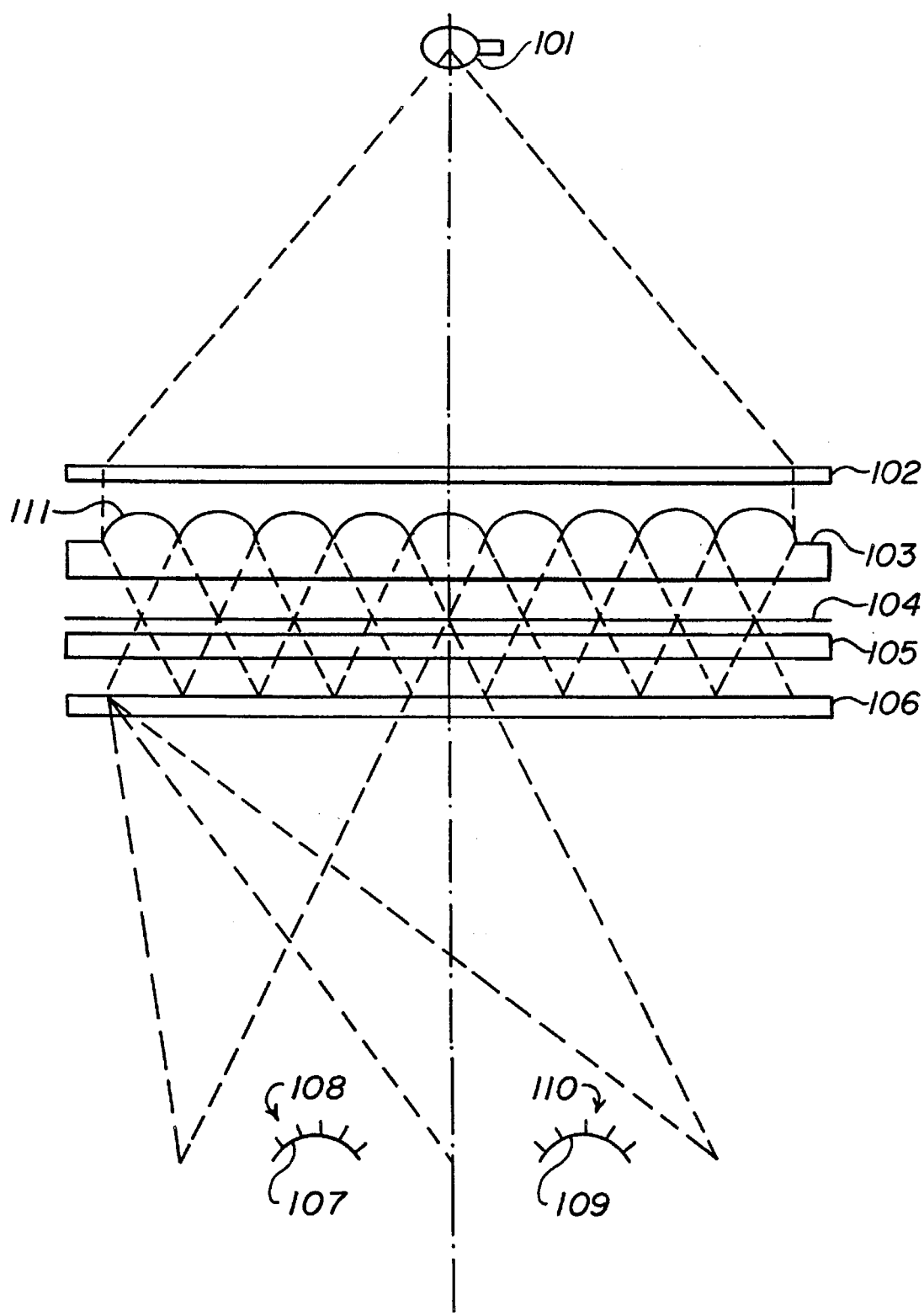
FIG. 4 is a schematic top view of a high brightness, high brightness-to-input-power ratio transmissive autostereoscopic display employing a single light source.

FIG. 4 shows schematically the top view of a high brightness, high brightness-to-input-power ratio autostereoscopic display. In this embodiment of the invention a lenticular lens 103 is used to form an array of light line images behind the liquid crystal display (LCD) 105 on the surface of a translucent, weakly diffusing panel 104. The lenticular lens in this case is an optical device which has on its surface a plurality of very narrow, vertical, equidistant, cylindrical lenslets 111 designed to accept the incident collimated light and to generate a multiplicity of said light lines. A fly's eye lens consisting of a two dimensional array of lenslets arranged in vertical columns and horizontal rows can be used as an alternative in some situations such as those requiring light spot illumination as described in U.S. Pat. No. 4,829,365. The Fresnel lens 106 concentrates and directs the light from a point-like light source 101, such as a short filament quartz halogen lamp or a short arc plasma discharge lamp, to the region in space 108, 110 where the eyes of the observer are located in order to view stereoscopic images. The light concentration is the actual means by which high image brightness and high brightness-to-input-power ratio are achieved.

Fresnel lens 102 collimates the light emerging from the light source 101 into a parallel beam which illuminates the lenticular lens 103. The individual cylindrical lenslets 111 focus the incident light into said light lines, forming a vertically oriented array on the surface of said light-diffusing panel 104. The position of the lenticular lens 105 with respect to the light source 101 and the focal lengths of said lenslets 111 are selected Such that said light lines have an appropriate spacing with respect to the pixel (light valve) columns of the LCD 105 so as to create left 107 and right 109 eye viewing zones 108 and 110, respectively, after the light passes through the second Fresnel lens 106 according to the principles disclosed in U.S. Pat. 4,717,949. The second Fresnel lens 106 concentrates most of the slightly diffused parallel beam of light emerging from the LCD 105 into the two viewing zones 108 and 110 located directly in front of the display. The viewing zones will be formed at one focal length from the Fresnel lens 106 if the light pitch (or spacing) is equal to the pitch of the pixel columns on the LCD 105. Thus, when the head of the observer is properly laterally positioned with respect to the principal axis of the display, the eyes will be in their respective viewing zones and the observer will see, due to the parallax phenomenon of vision, without the aid of special glasses, a stereoscopic image. Since the light emerging from the display is concentrated into these viewing zones 108 and 110, the image will appear to be Very bright, many times brighter, in fact, than the stereoscopic images produced by the displays disclosed in the patents discussed above. Consequently, it is possible to control the power input to the light source such that for an image of brightness commensurate with the application, less power would be consumed, thus resulting in a high brightness-to-input-power ratio, as compared to other stereoscopic displays, including those incorporating the features disclosed in the referenced patents.

It is possible to simplify the optical system in the displays by virtue of the fact that said viewing zones 108 and 110 can be regarded to be the exit pupils of the optical system; hence, the generated left and right images can be reimaged or otherwise effected by optics, just as any other image is, in a variety of ways familiar to those skilled in the art. It is, for example, feasible, using appropriate spacing, or pitch, between said light lines to create virtual viewing zones behind the LCD 105 and the lenticular lens 103 of FIG. 4, just as it is feasible to create virtual conventional two-dimensional images. Such virtual viewing zones can be re-imaged by a suitable lens into real viewing zones in front of the display.

Figure 5:
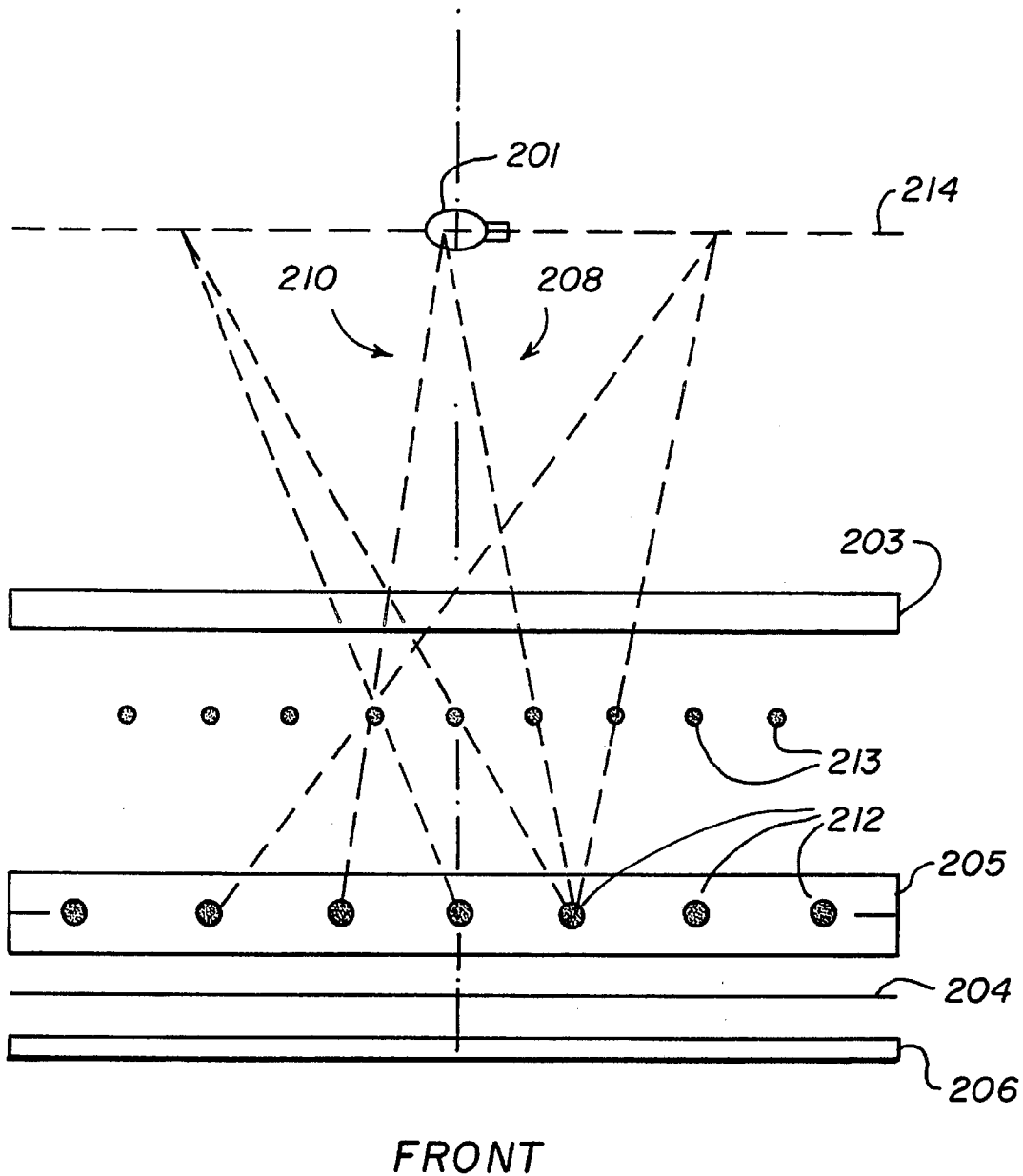
FIG. 5 is a schematic top view of the display in which the functions of said first and third optical means have been combined in a fourth optical means.

FIG. 5 shows schematically the top view of a high brightness, high brightness-to-input-power ratio autostereoscopic display in which virtual viewing zones are created in the plane 214 where the images of the light lines 213 appear to line up with the boundaries of the pixel columns 212. Fresnel lens 206 images the virtual viewing zones 208 and 210 into real viewing zones in front of the display where the observer, with his head in a proper position, can perceive stereoscopic images. Virtual viewing zone plane 214 in this case intersects the location of the light-emitting element of the light source 201. A weakly diffusing plate 204 serves to enlarge the viewing zone and produce more even illumination.

The advantage of the optical system of FIG. 5 compared to that of FIG. 4 is that one less optical component is required. To avoid confusion, rays of light incident upon the lenticular lens 203 and the light line generating rays emerging from said lenticular lens 203 are not shown in FIG. 5.

Both the display schematically depicted in FIG. 4 and the display shown in FIG. 5 have the disadvantage that the dimensions of the viewing zones are spatially restricted and, consequently, the position of the observer's head must be maintained within a rather narrow range in order for him to perceive stereoscopic images. This disadvantage can be overcome by using multiple light sources in the system, instead of one.

Figure 6B:
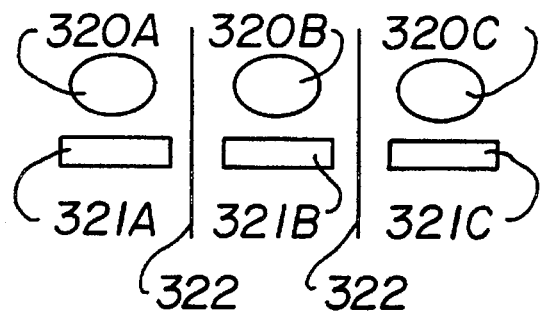
FIG. 6b is a schematic top view of the display employing three continuously lit light sources supplemented with three electro-optical light valves, thus providing for substantial freedom of lateral head movement without losing the stereoscopic image.
Figure 6A:
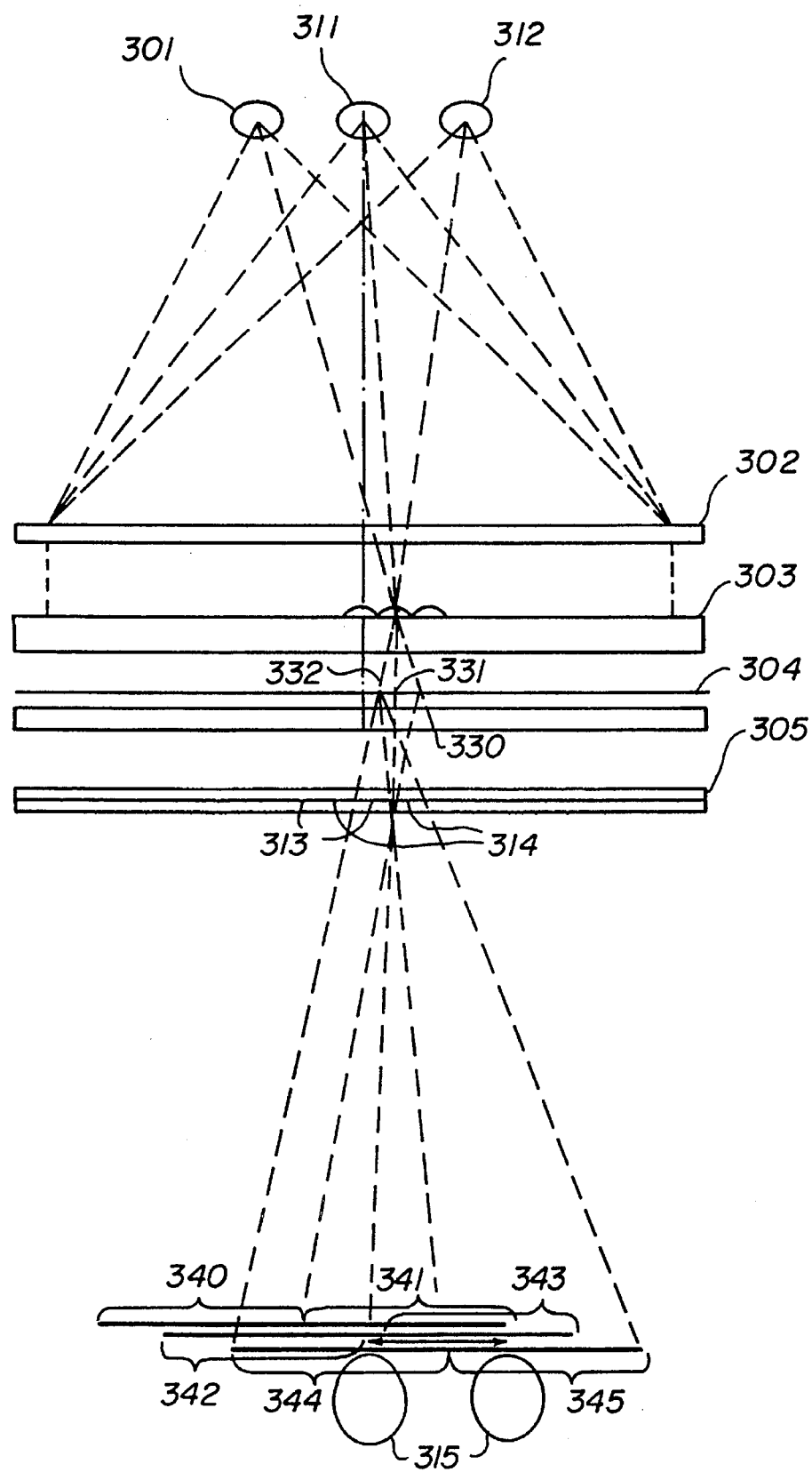
FIG. 6a is a schematic top view of the display employing three stroboscopic light sources, thus providing for substantial freedom of lateral head movement without losing the stereoscopic image.

FIG. 6a is a schematic presentation of the top view of an autostereoscopic display in which the restrictions to the lateral head movement are substantially removed. (The appropriate operation of which shifts the viewing zones, where the stereoscopic image is perceived, in relation to the lateral displacement of the observer's head. There is considerably more latitude with respect to the head movement toward and away from the display.)

In FIG. 6a only one of the three light sources 301, 311, 312 is on at any given time shifting the position of the viewing zone appropriately to the lateral position of the observer's head 315 such that the view of the stereoscopic image is maintained. While, for the sake of simplicity, only three light sources are shown in the figure, it is understood that to provide a smooth image transition as the head moves laterally, a plurality of light sources, greater than three, could be used in such a display. Since the turning on and off of the light sources 301, 311, 312 has to occur very rapidly, above the fusion frequency of vision, in order to avoid flicker and to allow the display of moving or rapidly changing images, incandescent lamps are not suitable because of their thermal inertia due to the relatively large mass of the filament. However, stroboscopic short arc plasma discharge lamps which can be switched very rapidly are suitable for this application, as are fluorescent lamps, both are power efficient, generate very bright light, and are commercially available.

The position of the observer's head 315 is continuously tracked using ultrasound, electromagnetic, or infrared position sensing means well familiar to those skilled in the art. Depending on the instantaneous positions of the observer's head, one of the three light sources 301, 311, 312 is turned on, while the one which was on preceding the head displacement, is turned off. Turning on the different lamps causes the position of the light lines formed by the lenticular lens 303 to shift laterally as shown in FIG. 6a. A shift in the position of the light lines laterally in one direction changes its position relative to the pixel columns of the LCD, causing a shift in viewing zones in the opposite direction. In FIG. 6a light from lamp 301 creates light line set 330 which is seen through the odd columns of pixels 313 in the left eye viewing zone 340 and through the even columns of pixels 314 within the right eye viewing zone 341. When the lamp 311 comes on, and lamp 301 turns off, the light lines are shifted to position 331, and the new lines are seen through odd pixel columns within the new viewing zones 342 and through the even columns in viewing zones 343. Thus, the left eye and right eyes viewing zones have been shifted laterally, due to the shift in position of the light lines relative to the pixels. Likewise, when lamp 312 comes on, the light lines are shifted to position 332, and the zones are shifted to positions 344 and 345. Since the three sets of zones overlap, a lamp can always be turned on which delivers a right eye zone to the right eye of the observer and a left eye zone to the left eye of the observer as long as the observer stays within the area defined by the three sets of zones. In general, the lamp which creates zones who's centers are closets to the observer's eye positions at any given moment will be turned on.

It should be noted that the bright area where the light is concentrated by the Fresnel lens 302 will move in the same direction as the light lines and thus in the opposite direction to the zones. It is necessary, therefore, by the proper choice of diffusers and lenses, to create an area of light concentration that is wide enough so that its left eye coincides with the left edge of zone 340 when lamp 301 is on, and its right edge coincides with the right edge of zone 345 when lamp 312 is on.

As in FIG. 5 a lenticular lens 303 collimates the incident light on to a weak diffuser 304 on which surface the array of light lines is formed and which passes on to the flat display panel 305.

An alternate illumination system, schematically depicted in FIG. 6b, makes use of incandescent light sources 20A, 320B, 320C such as quartz halogen lamps, which are on constantly during the operation of the display. In front of each lamp 320A, 320B, 320C is an electro-optical valve 321A, 21B and 321C, such as a liquid crystal shutter, which is appropriately turned on and off in relation to the head is placement. Baffles 322 and 323 are used to prevent stray light and cross-talk between the three light channels. The advantage of this scheme is that the lamp and light valve control is much simpler and less costly than a control system for plasma arc discharge lamps, but the disadvantages are that much of the light would be lost due to absorption by said electro-optical light valves and, because three, instead of one, lamps are on at any given time, the display would be less power-efficient.

Figure 7A:
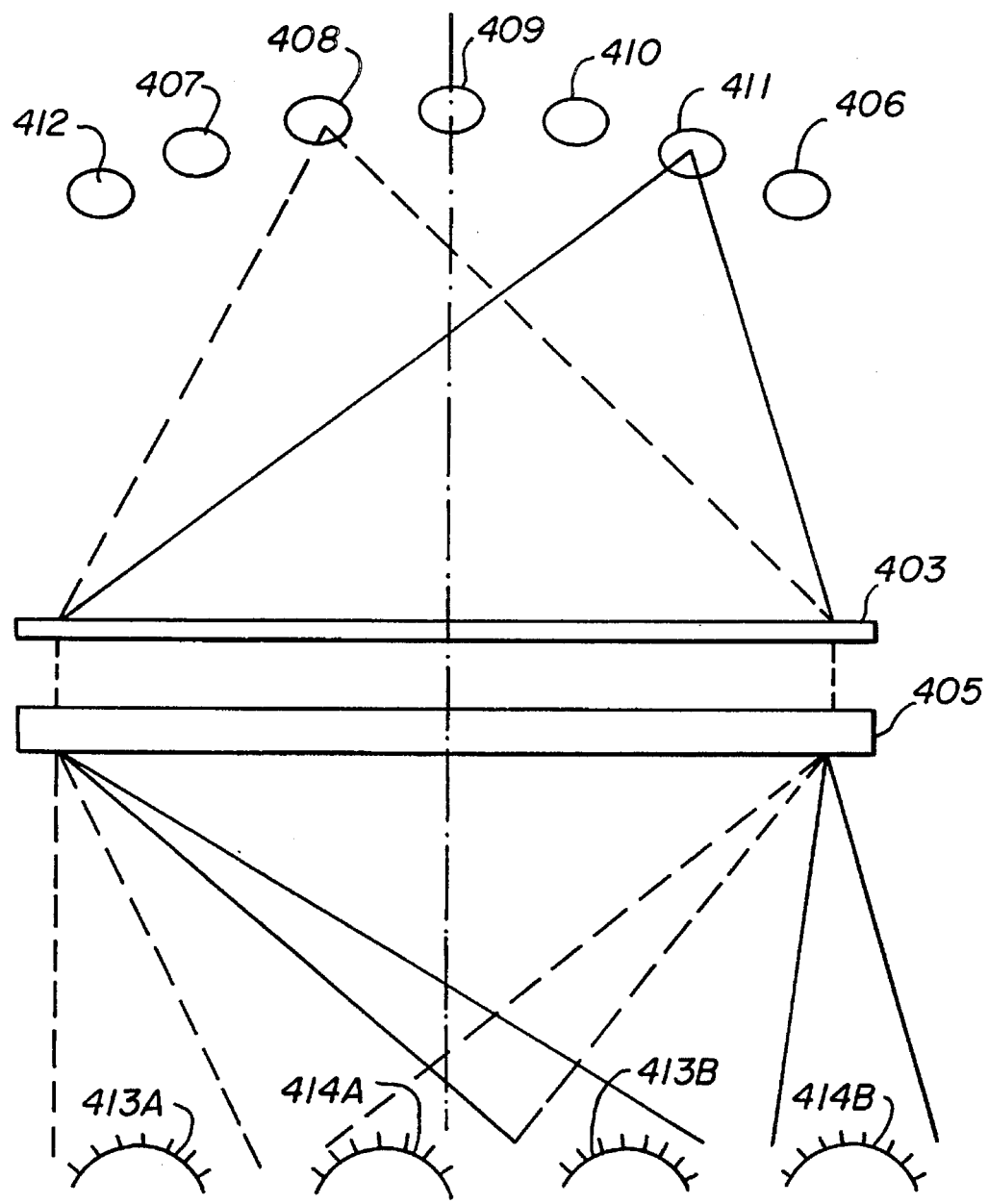
FIG. 7a is a schematic top view of the display with a plurality of stroboscopic light sources for one observer, the appropriate operating of which permits for said "look around" and expanded viewing zone functions to be implemented.

FIG. 7a depicts schematically a multiple lamp illumination system which would allow a smooth stereoscopic image tracking as the head of the observer moves laterally and the stroboscopic lamps 406–412 are turned on and off rapidly and sequentially in response. For instance, when the head is in the extreme right position, lamp 412 is turned on, generating the a viewing zone for the observer's left eye 413b and right eye 414b, but when the head is in the center, lamp 409 is turned on, creating two new viewing zones 413a and 414a. As before, the lenticular lens 403 produces said array of light line images. For the sake of clarity other optical elements are omitted from this figure.

This scheme can be also used to implement a "look around" feature with which the observer would be able to see different perspectives of an object or a scene as he moves his head with respect to the display. In this scheme again the position of the head is tracked as explained earlier, and the appropriate stroboscopic lamps are turned on. Simultaneously different perspective views of the object or scene would be displayed on the LCD 405 corresponding to the position of the head. The image information necessary to implement this feature would either be computer generated or acquired in real time by multiple pair of TV cameras, or by moving a pair of cameras in proper relation to the position of the head to get the right perspective view. Alternately, the TV cameras could be stationary, but suitable optical means with a lower mass and inertia could be moved with respect to the objective lenses of the cameras to acquire images of different perspectives of a scene or an object.

Figure 7B:
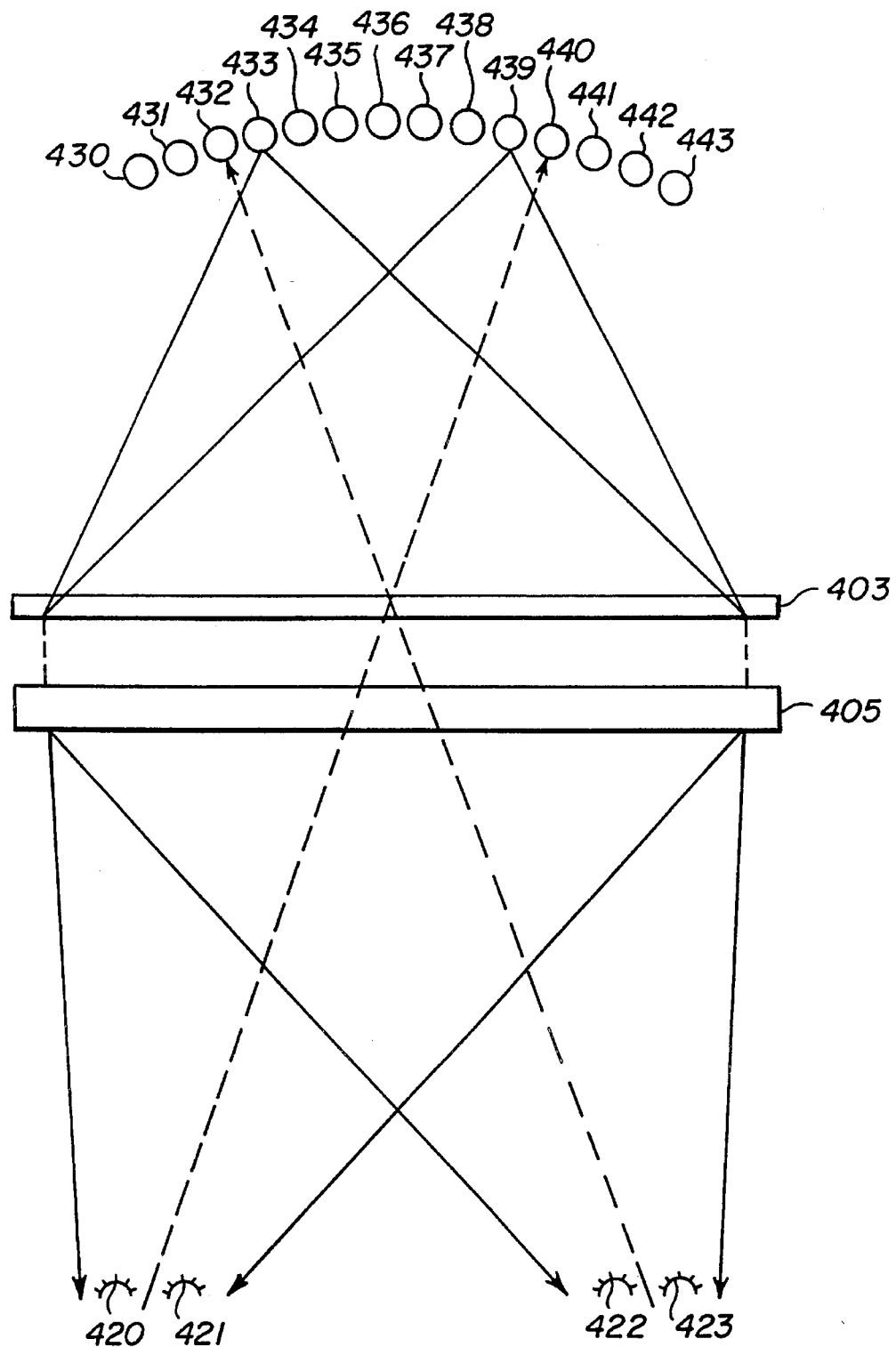
FIG. 7b is a schematic top view of the display with a plurality of stroboscopic light sources for multiple observers.

Using this system as shown in FIG. 7b it is possible to track the heads of multiple observers instead of just one, the observer on the left having eyes 420, 421 and the observer on the right having eyes 422, 423. Here, two observers are shown, with eyes located, at any instant, at positions 420 and 421, for one observer, and 422 and 423 for another. The observers are tracked by an appropriate means such as an infrared camera with a field of view wide enough to encompass both observers. Again, a bank of multiple light sources, 430–443 is positioned behind the display. In this instance, two light sources are on at any given moment. One light source, 432 is selected so that it directs light into the viewing zones of the first observer's eyes 422, 423, and the other lamp 440 is selected so that it directs light into the viewing zones of the other observer's eyes 420, 421. Neither observer sees light that is directed toward the other observer. Unless the observers are behind one another, the head tracking system can always independently select two light sources to be on at any given time such that light from one light source is directed toward one observer, and the light from the other light source is directed toward the other observer, no matter where the observers move in front of the display.

All displays schematically depicted and discussed to this point have another disadvantage in that their horizontal resolution for stereoscopic images is one half of the corresponding pixel column resolution of said LCD. For example, the horizontal resolution of many currently available black and white or color LCDs is 640 columns. Because one half of the pixel columns are used to generate left eye images and the other half the right eye images (i.e., halves of a stereopair), the resolution of the resulting stereoscopic image is 320 columns. Using two of said stroboscopic light sources it is possible to provide a high brightness autostereoscopic display in which the full iresolution of the LCD is preserved in the stereoscopic image.

Figure 8:
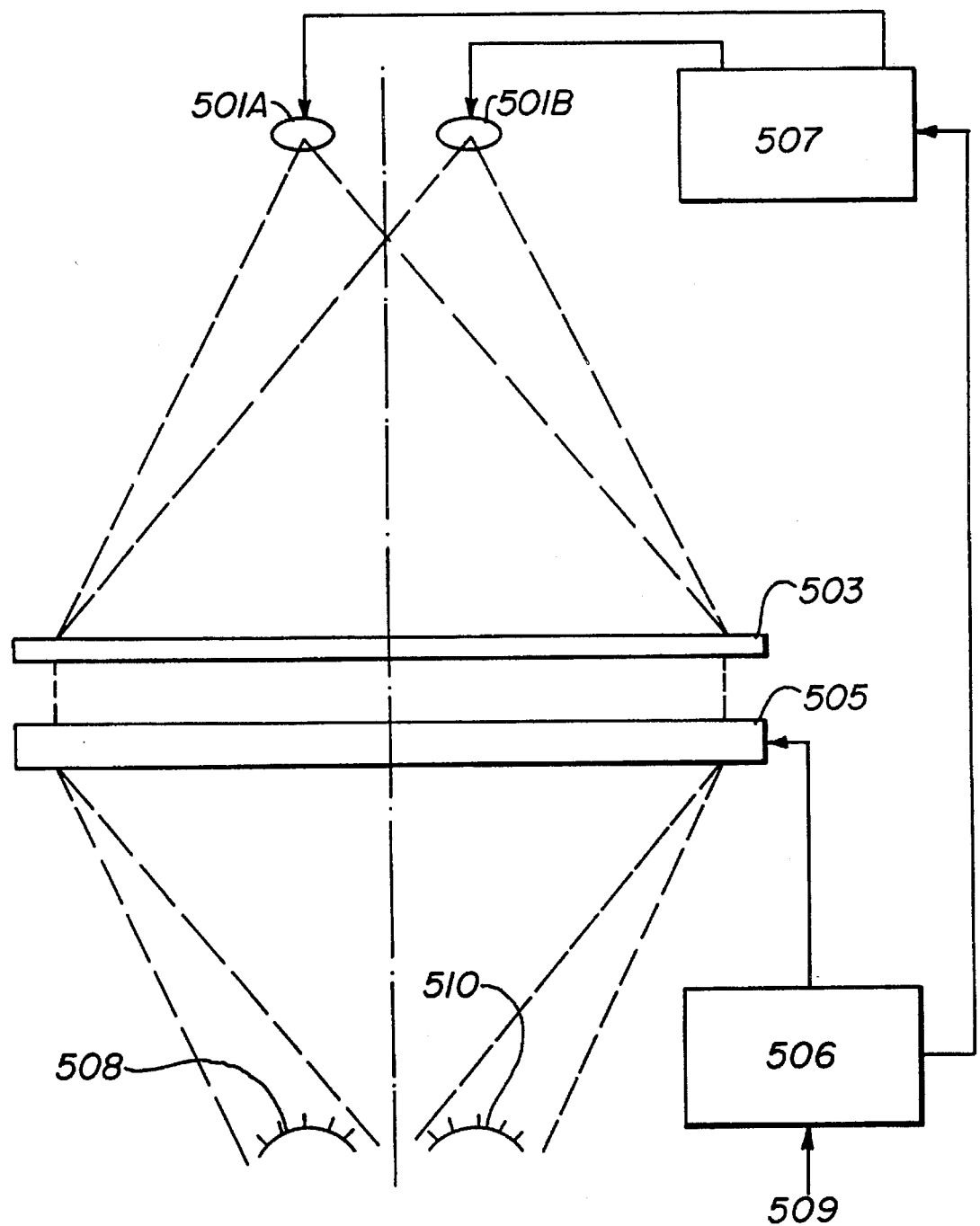
FIG. 8 is a schematic top view of a high brightness, high brightness-to-input-power ratio autostereoscopic display in which the resolution of stereoscopic images is equal to that of the horizontal column resolution of said flat display panel.

FIG. 8 schematically shows a top view of a high brightness, high brightness-to-input-power ratio autostereoscopic display in which the resolution of stereoscopic images is equal to that of the horizontal column resolution of said flat display panel. The two stroboscopic light sources 501A, 501B are rapidly turned on and off by the controller 507 such that only one source is on at any given time. The switching is in synchronism with the frame generation rate of said LCD 505. In fact, the flashing of a light source occurs at the moment when an image frame scanning has been completed on said LCD 505. This process results in generation of two sets of light lines, each set displaced by one pixel column from the other by the lenticular lens 503. Each of the observer's eyes 508, 510 thus alternately sees through the LCD 505 the light lines first behind the odd, then behind the even sets of columns of said LCD 505, while the other eye sees first the light lines behind the even, then behind the odd sets of the columns. The electronic control system 506 of the LCD 505 rapidly changes the left and right eye images displayed on the odd and even columns and generates synchronization signals for the controller 507 to synchronize the firing of the light sources 501A, 501B. The data defining the stereopair image is fed into said electronic control system 506 via the input port 509. In this manner the observer will perceive full resolution stereoscopic images, as long as the head position is such that the eyes remain in their respective viewing zones. The principles of such a system are described in more detail in U.S. Pat. No. 5,036,385.

If multiple pairs of alternately strobed light sources would be used in an arrangement similar to the one shown in FIG. 7, the position restriction would be substantially removed and full resolution maintained as the appropriate pair of stroboscopic point-like light sources were activated, depending on the lateral displacement of the observer's head. The head position would be tracked as explained above.

Likewise, multiple person head tracking could also be accomplished with the full resolution system if more than one set of lamps were used at a given time, and which sets of lamps are on was determined by information on the observer's locations provided by a head tracking system. Using the same approach, full resolution "look around" high brightness autostereoscopic display could be implemented.

Figure 9A:
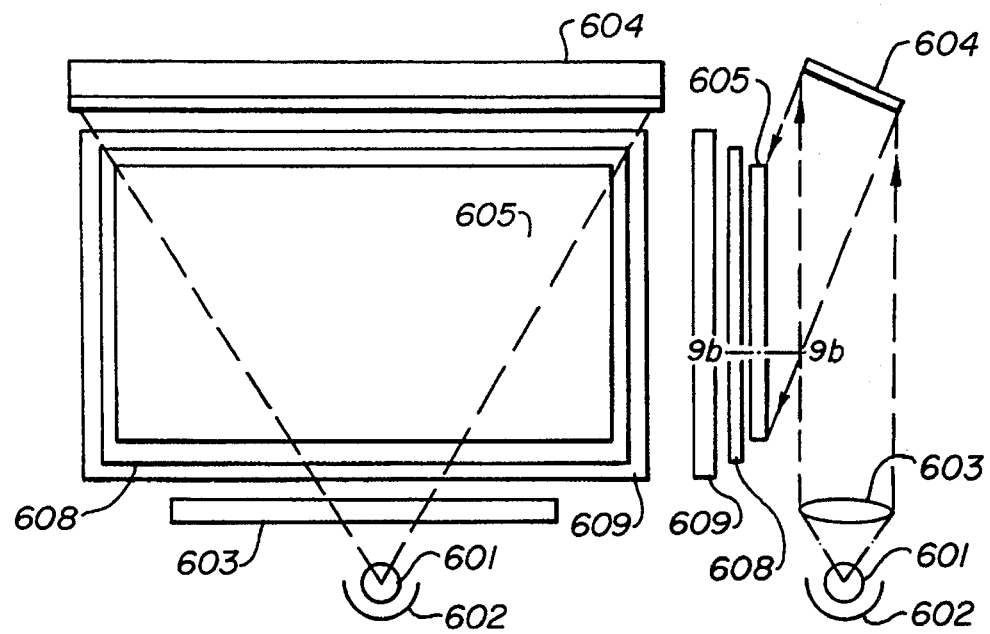
FIG. 9 depicts schematically the rear and side views of a compact version of an autostereoscopic display, FIG. 9a being a rear view and FIG. 9b being a side view with a magnified segment of the optical component which is used to redirect the incoming light.
Figure 9B:
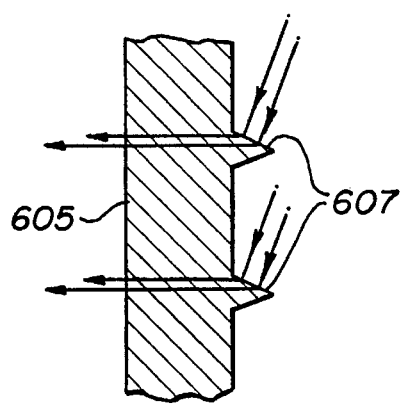

FIG. 9 shows schematically the rear (FIG. 9a) and side (FIG. 9b) views of a compact version of the optical system of a high brightness, high brightness-to-input-power ratio autostereoscopic display. In this version the optical system is folded, resulting in a compact package with much reduced depth as compared to the displays previously herein described.

A point-like light source 601, which can be an incandescent or a stroboscopic lamp, radiates intense light which is directed by the reflector 602 to the cylindrical lens 603 which forms a fan-shaped beam of light incident upon the concave cylindrical Fresnel mirror 604. The mirror 604 collimates the light and directs it to the refractor plate 605. The refractor plate 605 has a large plurality of narrow ridges 607 of triangular cross-section which are also shown in the magnified section of said refractor plate 605. These ridges 607 run in a horizontal direction and are equidistant from each other. Ridged material of this type is made by the Minnesota Mining and Manufacturing Co (3M), and a similar material is described in U.S. Pat. No. 4,874,220. As shown in the magnified section, the incident light is refracted and directed through the refractor plate 605 toward the Fresnel lens 608. The Fresnel lens 608 has a plurality of cylindrical lenslets (not shown) running in the vertical direction, the plurality equal to one half of the columns of the LCD 609. The lenslets are aligned in a certain manner with the boundaries between the pixel columns such that they convert the incoming light into an array of appropriately spaced thin bright light lines. The result is that a bright stereoscopic image is perceived by an observer viewing this display.

Using the optical system of FIG. 9 with a single light source 601, results in stereoscopic images which have one half of horizontal or column resolution of the LCD 609. Full resolution, without sacrificing any of the image brightness, can be achieved, as in the display of FIG. 8, by using two, instead of one, light sources. Looking at the side view of FIG. 9b, the two light sources would be located next to each other and appropriately spaced. Such light sources would have to be stroboscopic lamps of the type mentioned earlier. The function of such a system was explained previously with reference to FIG. 8.

It is also possible to implement, using the optical configuration of FIG. 9, the expanded viewing zone and "look around" functions previously described with reference to FIG. 7 provided that multiple lamps or sets of lamps are used in a row along side of light source 601.

The foregoing methods and constructions have been described for the purpose of illustration and not of limitation, certain embodiments of a high brightness, autostereoscopic display with high power efficiency. Many other variations and modifications of the embodiments described in this disclosure will become apparent to those skilled in the art. These are intended to be included within the scope of this invention.

The embodiments of the invention in which an exclusive property of privilege is claimed are defined as follows:

1. A method of displaying an autostereoscopic image within a head volume of at least one observer located in front of a transparent display screen having a plurality of odd and even numbered light valve columns wherein the head volume is only slightly larger than the at least one observer's head, comprising the steps of:

forming a plurality of parallel, equidistant lines of light in a plane adjacent the transparent display screen so that one of the lines of light illuminates at least two adjacent light valve columns;

displaying a left eye image on one of the odd and even light valve columns and simultaneously displaying a right eye image on the other of the even and odd light valve columns; and concentrating the light from the lines of light in a left eye viewing zone and a right eye viewing zone substantially within the head volume of the at least one observer located in front of the display screen;

whereby the autostereoscopic image is a half-resolution image of the composite image on the display screen.

2. The display of claim 1 further comprising positioning means for varying the position of the light source.

3. The method of claim 1 in which the step of forming a plurality of parallel, equidistant lines of light comprises illuminating one of a lenticular lens and a fly's eye lens array located behind the display screen.

4. The method of claim 1 further comprising laterally shifting the plurality of lines of light in relation to said light valve columns in response to a lateral shift of the at least one observer in front of the display screen for viewing of the autostereoscopic image by the shifted observer.

5. The method of claim 4 wherein the left eye image and the right eye image comprise a perspective view of an object corresponding to an image of the object seen by the laterally shifted observer.

6. A method of displaying an autostereoscopic image, comprising the steps of:

forming a plurality of parallel, equidistant lines of light in a plane adjacent a transparent display screen having a plurality of odd and even numbered light valve columns, so that one of the lines of light illuminates at least two adjacent light valve columns;

displaying a left eye image on one of the odd and even light valve columns and simultaneously displaying a right eye image on the other of the even and odd light valve columns;

concentrating the light from the lines of light in a left eye viewing zone and a right eye viewing zone of at least one observer located in front of the display screen; and laterally shifting the plurality of lines of light in relation to said light valve columns in response to a lateral shift of at least one observer in front of the display screen so that the at least one left eye viewing zone and the at least one right eye viewing zone correspondingly shift for viewing of the autostereoscopic image by the shifted observer.

7. The method of claim 6 in which the step of forming a plurality of parallel, equidistant lines of light comprises illuminating one of a lenticular lens and a fly's eye lens array located behind the display screen.

8. The method of claim 6 wherein the left eye image and the right eye image comprise a perspective view of an object corresponding to an image of the object seen by the laterally shifted observer.

9. A method of displaying an autostereoscopic image within a head volume of at least one observer located in front of a display screen having a transparent array of odd and even numbered light valve columns wherein the head volume is only slightly larger than the at least one observer's head, comprising the steps of:

sequentially forming at least two plurality of parallel, equidistant lines of light in a plane adjacent the display screen, so that at least one plurality of lines of light is laterally displaced by one light valve column from the at least one other plurality of lines of light, and at least one line of light from each plurality of lines of light illuminates at least one light valve column;

synchronously, with the formation of each plurality of lines of light, displaying a two dimensional left eye image and a two dimensional right eye image on alternate light valve columns so that during every other line formation one half of the left eye image is displayed on the odd light valve columns and, simultaneously, one half of the right eye image is displayed on the even light valve columns, and, during each alternate every other formation of lines the remaining one half of the left eye image is displayed on the even light valve columns and, simultaneously, the remaining one half of the right eye image is displayed on the odd light valve columns; and concentrating the light from the lines of light in at least one left eye viewing zone and at least one right eye viewing zone substantially within the head volume of the at least one observer in front of the display screen, whereby the autostereoscopic image is a full-resolution image of the composite two dimensional image on the display screen.

10. The method of claim 9 in which the step of sequentially forming at least two plurality of parallel, equidistant lines of light comprises sequentially illuminating a lenticular lens with light from at least two light sources.

11. The method of claim 9, further comprising the step of laterally shifting the at least two plurality of lines of light in relation to said light valve columns in response to a lateral shift of the at least one observer so that the at least one left eye viewing zone and the at least one right eye viewing zone correspondingly shift for viewing of the autostereoscopic image by the shifted observer.

12. The method of claim 9 wherein the left eye image and the right eye image comprise a perspective view of an object corresponding to an image of the object seen by the laterally shifted observer.

13. A method of displaying an autostereoscopic image, comprising the steps of:

sequentially forming at least two plurality of parallel, equidistant light lines in a plane adjacent a display screen having a transparent array of odd and even numbered light valve columns, so that at least one plurality of lines is laterally displaced by one light valve column from the at least one other plurality of lines, and at least one line from each plurality of lines illuminates at least one light valve column;

synchronously, with the formation of each plurality of lines, displaying a two dimensional left eye image and a two dimensional right eye image on alternate light valve columns so that during every other line formation one half of the left eye image is displayed on the odd light valve columns and, simultaneously, one half of the right eye image is displayed on the even light valve columns, and, during each alternate every other formation of lines the remaining one half of the left eye image is displayed on the even light valve columns and, simultaneously, the remaining one half of the right eye image is displayed on the odd light valve columns; and laterally shifting the at least two plurality of lines in relation to said light valve columns in response to a lateral shift of at least one observer so that the at least one left eye viewing zone and the at least one right eye viewing zone correspondingly shift for viewing of the autostereoscopic image by the shifted observer.

14. The method of claim 13 wherein the left eye image and the right eye image comprise a perspective view of an object corresponding to an image of the object seen by the laterally shifted observer.

15. A method for forming an autostereoscopic image, comprising the steps of:

illuminating a lenticular lens with a diverging light beam from a source located behind the lens;

forming a plurality of light line images in a plane located in front of the lens and behind a transparent display screen in such a way that the light lines and the display screen create a virtual left eye viewing zone and a virtual right eye viewing zone in a plane located behind the lens;

displaying a left eye image and a right eye image on the transmissive display screen having a plurality of adjacent light valve columns, located in front of the lens; and reimaging the virtual left eye viewing zone and the virtual right eye viewing zone into at least one real left eye viewing zone and at least one real right eye viewing zone containing the autostereoscopic image, in front of the display.

* * * * *